Figure 1:
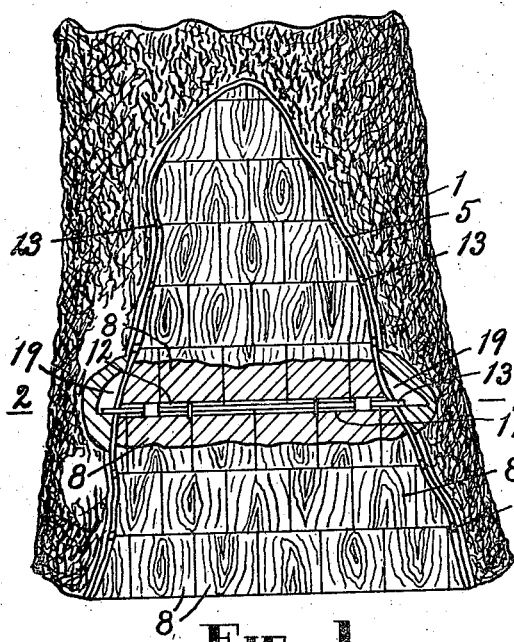

G. E. STONE.
ART OF TREE SURGERY.
APPLICATION FILED MAR. 30, 1916.

1,218,333.  Patented Mar. 6, 1917.

WITNESS
A. C. Fairbanks.

INVENTOR.
George E. Stone,
BY
Frank A. Cutter,
ATTORNEY.

UNITED STATES PATENT OFFICE.

GEORGE E. STONE, OF AMHERST, MASSACHUSETTS.

ART OF TREE SURGERY.

1,218,333.  Specification of Letters Patent.  Patented Mar. 6, 1917.

Application filed March 30, 1916. Serial No. 87,854.

*To all whom it may concern:*

Be it known that I, GEORGE E. STONE, a citizen of the United States of America, residing at Amherst, in the county of Hampshire and State of Massachusetts, have invented certain new and useful Improvements in the Art of Tree Surgery, of which the following is a specification.

My invention relates to improvements in the treatment of trees wasted by decay so that cavities are formed therein, and weakened in consequence of such decay and the presence of such cavities, and resides in a new and original process or method of arresting the decay of and closing the cavities in trees, and in the new and original means employed for so doing and for directing the flow or movements of the callus growths or the healing tissues that are associated with wounds or cavities in trees, all as hereinafter set forth.

This invention comprehends the reinforcement of trees weakened by decay, so that the decay is arrested and the trees are rendered strong enough to withstand the elements, and to this end I employ a new and novel method and new and novel means which approach more nearly and lend themselves more naturally to the physical requirements of decayed and hollow trees and to the repair of the same, than do other means for a similar purpose, however or by whatever method applied. My method and means obviates the need of loading and overloading tree cavities with cementitious materials, which latter practice is irrational, cumbersome, injurious, and generally unsatisfactory, as is now a matter of common knowledge.

None of the cementitious materials that have been heretofore employed for cavity filling or treatment, such as concrete, asphalt, etc., possesses the physical properties of wood, which latter is what I use, neither are such materials adapted to adjust themselves or become adjusted to the various and complex movements which occur in trees, and on this account they are very objectionable. Wood the material which I employ in this invention is practically identical with tree structure or material.

The primary object of my invention is to provide a practicable, efficient, and satisfactory method of and means for closing tree cavities with wood. I so employ and arrange the wood as to utilize to the best advantage the inherent characteristics thereof and to coördinate such characteristics with those of the tree treated or repaired with said wood. In the attainme it of this object I avoid the need of filling cavities in trees with substances or materials that have a tendency to overload them with weight which produces harmful results, and eliminate the bad effects produced by bleeding and obviate the unsightly discolorations on the bark due to magnesian compounds derived from cement and slime-flux, resulting from the bleeding, both of which seriously injure the bark of trees and often cause the death of the same.

The material which I use consists of wood, as before stated, which is a lignatious material, and this is by preference treated chemically and is in the form of blocks. This material possesses a chemical composition and molecular arrangement, is composed of a mechanical structure, and has the rigidity, modulus of elasticity, power of imbibition, and geometrical arrangements of elements which are similar and correspond to the elements or structural units that exist in trees.

These chemically treated blocks are readily adapted to cavity work, because they can be cut to various sizes and forms, according to the requirements in any given case, and each block is composed of heterogeneous structural elements, homologous with those peculiar to trees, said blocks constituting homogeneous units that are similar in their structural formation to the corresponding elements existing in trees.

The blocks are brought into correspondence with the tree units by being so prepared or cut and arranged that they are similar to similar tree units, the radial, tangential, and cross-section surfaces of said blocks coinciding with those that exist in trees. In other words, the cutting and arrangement are of a nature which brings the annular rings and the medullary rays common to the blocks to coincide in general geometrical arrangement with those of trees, causes the radial surfaces of said blocks to stand parallel with those in said trees, and locates the tangential surfaces of said blocks parallel with those of said trees. It follows, therefore, that the blocks will be acted upon by external influences in practically the same manner as are corresponding elements in trees.

The material that I employ possesses a certain amount of rigidity, which is necessary, but such material is less rigid and more flexible than brick, stone, or concrete, and not so plastic as other cementitious substances, all of which have been used heretofore in the work of filling tree cavities. Wood possesses more than any other substance the physical properties of those found in trees.

In producing my invention I have taken into consideration all of the movements occurring in the tissues in trees and arising from various causes, such as the swaying movements produced by winds, and those arising from external agencies such as changes in temperature, and the material that I use and the method in which I use it render the same peculiarly well adapted to meet the conditions incident to these various movements and as no other material.

Not only are movements in trees produced by the winds and changes in temperature, but also by changes in moisture and barometer, variations in tissue tensions, and other agencies, and all are effectually met or counteracted by the use of my blocks in closing cavities.

Elastic cement is used as required to close joints and to augment the capacity of the blocks for meeting successfully the above-mentioned tree movements.

The chemical treatment to which the blocks are subjected is for preservative purposes and does not to any great extent change the original nature or character of said blocks.

A further object of the invention is to provide convenient and practical means for securely holding the blocks in place in the cavities, so that the latter when once closed will so remain for an indefinite period, the closure being very strong and durable.

Other objects and advantages will appear in the course of the following description.

I attain the objects and secure the advantages of my invention by and with the aid of the means illustrated in the accompanying drawings, in which—

Figure 2:
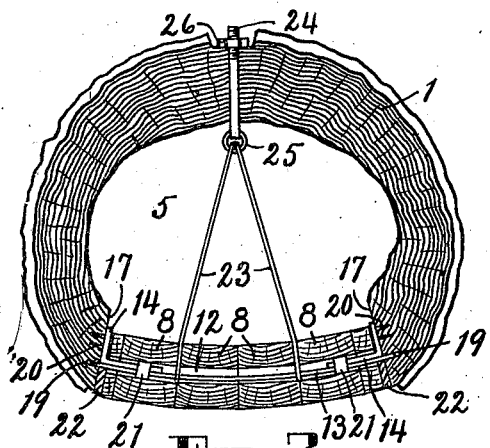
Figure 3:
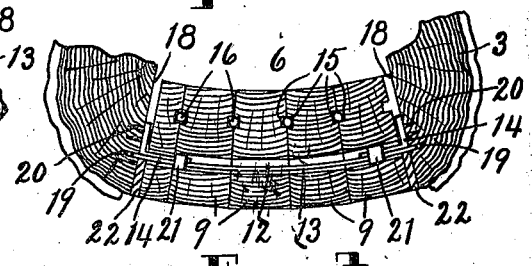
Figure 4:
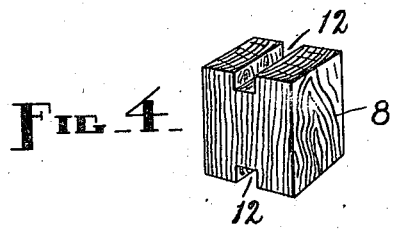
Figure 5:
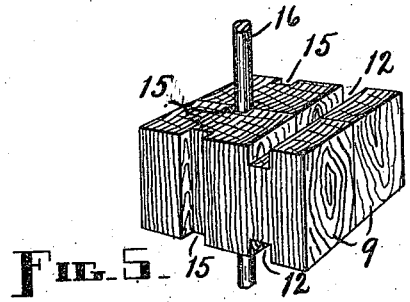

Figure 1 is an elevation of the lower part of a tree-trunk having a cavity therein, and of a closure for such cavity, which closure embodies a practical form of my invention, this and the other views being illustrative of the method as well as of the means; Fig. 2, a cross section taken on lines 2—2, looking down, in Fig. 1; Fig. 3, a cross-section somewhat similar to the preceding view, but showing a modification of the cavity closure construction appearing in said view; Fig. 4, a perspective view of one of the blocks used in the first form of closure; Fig. 5, a perspective view of two of the blocks and one of the vertical rods used in the second form of closure, and, Fig. 6, a third cross-section illustrating still another modification.

In Fig. 1 portions of the tree-trunk are broken out at opposite sides of the cavity, and the intervening blocks are in section, the better to show the construction.

Similar reference numerals designate similar parts throughout the several views.

In the drawings tree-trunks are represented at 1, 3, and 4, and cavities therein at 5, 6, and 7, respectively, while 8, 9, 10 and 11 represent specimens of wood blocks the required number of which is used in any given case. It is to be assumed that these blocks have been treated with a preservative, and that such blocks are made in various sizes and shapes according to requirements and in order that they may be used most advantageously, although as a rule the blocks will have a generally or approximately rectangular shape.

Figure 6:
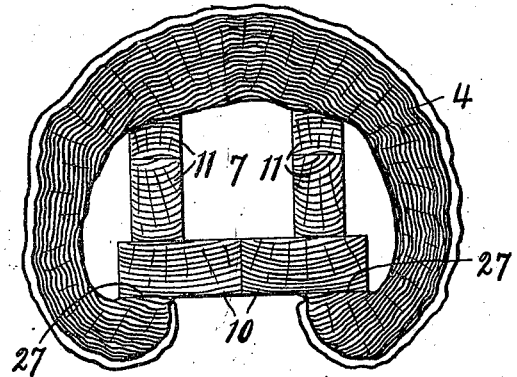

As is well known, a tree has radial, tangential, and cross-section surfaces, the first of these extending from the center to or toward the circumference of said tree, the second or tangential extending at right-angles or at an angle to the radial, and the cross-section being a horizontal surface upon which are displayed the annular rings and medullary rays, as represented in the tree-trunks 1, 3, and 4, in Figs. 2, 3 and 6. Each of the blocks 8, 9, and 10 is so cut that it may be positioned in the tree with cross-sections at the top and bottom of such block, or horizontal like those of the tree, the radial sides of such block radiating (in direction) from the center of the tree, and the tangential sides of such block standing in angular relation to said radial sides and broadside to the incomplete portion, because of the cavity, of the circumference of the tree, and, furthermore, so that such block may be similarly positioned relative to another block of generally like characteristics and arrangement. One tangential surface of each of the blocks 8, 9, and 10 is at the front and the other tangential surface behind, while the radial surfaces of each of said blocks 8 and 9 are contiguous to other blocks or another block and one side or edge of the cavity entrance, according to location in the horizontal row or tier of blocks. None of the radial surfaces of the blocks 10 is contiguous to a side of the cavity entrance, owing to the fact that such blocks are not directly in such entrance but behind it.

My method, therefore, in its broader aspect, consists in placing in a tree cavity, to close the entrance thereto, wood blocks which have been cut in general conformity to the geometrical arrangement of the elements or structural units of the tree, arranging said blocks in said cavity with their cross-sections in correspondence with each other and with the tree structure, their radial sides radial to the tree, and their tangential sides outwardly and inwardly disposed. These several surfaces are represented to best advantage in Figs. 4 and 5, wherein appear the surface markings on the respective surfaces, that is, the markings indicative of and to be found on such surfaces.

The blocks are usually built up in the form of a wall between the outer edges of the recess, opening, or cavity in the tree, as shown in Figs. 1, 2 and 3, but when such edges roll inwardly, as sometimes occurs, the closure of blocks is located behind these inturned edges, as shown in the last view.

The blocks 8 and 9 have transverse top and bottom grooves 12 therein, to receive horizontal supporting rods 13 and angle-irons or brackets 14 which I prefer to employ when the wall is to be built between the edges of the cavity, and said blocks 9 have also vertical grooves 15 in opposite sides to receive rods 16 that may be added to strengthen the structure.

Before closing either the cavity 5 or 6 the edges or sides of the entrance thereto are cut away to whatever extent may be necessary, as indicated at 17—17 in Fig. 2 and at 18—18 in Fig. 3, and oppositely disposed vertical grooves or slots 19 are cut in said sides at the proper heights, each of said slots having an approximately horizontal bottom, parallel front and back sides, and a tapering or curved side or inner end that extends upwardly from the inner end of said bottom and out to the side of said entrance through which the slot opens. The brackets 14 are arranged in pairs in either cavity entrance, with two of the arms of those in each pair extending toward each other, and the other two arms fastened either to the sides 17 or the sides 18, as the case may be, in some suitable manner, as by means of staples 20. The brackets 14 are placed in position and secured behind the slots 19. The rods 13 are located in front of the brackets 14, with the ends of said rods in the slots 19 and resting on the bottoms of said slots. The slots 19 must be of such dimensions as to permit the rods 13 to be placed in position, and to this end one of said slots in each pair may be cut deeper at the base into the tree than the other slot in such pair, as best shown in Fig. 1 wherein the right-hand slot extends far enough into the tree-trunk 1 to enable the rod to be put in place. The rods 13 and the contiguous arms of the brackets 14 are fastened together in any suitable manner, as by means of sleeves 21. In such portions of the cavity entrance which are too narrow for the brackets 14 to be employed they will be omitted and only the rods 13 used. The grooves 12 in the blocks 8 and 9 are wide enough to receive not only the rods 13, but the arms of the brackets 14 with which said rods are connected.

In closing the space between the prepared sides 17 of the entrance to the cavity 5 in the tree-trunk 1, the blocks 8 are built up in such space and fitted to said sides, tier upon tier, with the rods 13 and the front arms of the brackets 14 between the tiers in the grooves 12, until such space is closed. The rods 13 lock the blocks 8 together, since the lower half of each rod lies in the grooves 12 in the tops of the blocks under such rod and the upper half of such rod lies in the grooves 12 in the bottoms of the blocks above the rod. In this manner and by this means I obtain a strong, durable, and stable structure. Usually the rods 13 are bowed to some extent, with their convexity outward, so as to give a greater or less lateral convexity to the closure on the exterior. The building up operation commences at the base, of course, and the rods 13 one after another are put into place following the laying of the tiers of blocks one after another.

The crevices in and around the block closure are filled with elastic cement, which renders said closure water-tight and provides whatever additional flexibility and compressibility may be required. The elastic cement filling between the sides 17 and the adjacent parts of the block closure is represented at 22—22 in Fig. 2, but is omitted from Fig. 1. Similar filling also appears in Fig. 3.

It is necessary to cut the end blocks in each tier to whatever extent may be required in order that such blocks shall conform to the longitudinal dimensions of adjacent portions of the sides 17, and the same thing is true with regard to the blocks 9.

The closure in Fig. 3, which is constructed with the blocks 9, aside from the longer blocks used and the presence therein of the grooves 15, differs from that previously described only in the additional feature of the vertical rods 16. These rods occupy the channels formed by the grooves 15, just as the rods 13 occupy the channels formed by the grooves 12, being placed in position during the building operation, and like said rods 13 said rods 16 lock the blocks together. The rods 16 augment the rods 13 and add to the strength and stability of the structure in which they are used. The blocks 9 and the rods 16 may be employed for the lower portion of a closure the upper portion of which is made up of the blocks 8.

Additional strength may be provided for the closure by anchoring the same to the tree-trunk behind in a way to resist any force tending to thrust said closure outwardly. In Fig. 2 I show such anchorage means in the form of a pair of tie-rods 23, an eye-bolt or a bolt 24 provided with a ring 25, and a nut 26. There may be more or less than two tie-rods 23, and each is introduced between two blocks 8, such blocks being cut away to admit the tie-rod, and hooked over or otherwise attached at its front end to the adjacent rod 13. The bolt 24 is inserted in an opening bored through the back side of the tree-trunk 1, with the ring 25 inside of said tree-trunk, and the inner end of the tie-rods 23 are hooked into or otherwise attached to said ring. The nut 26 is screwed onto the rear terminal of the bolt 24 and tightened against the back of the tree-trunk until the desired tension is produced on the parts, including the rod 13 with which the tie-rods 23 are connected. These anchorage members are approximately horizontal, and there may be as many sets, one above the other, as are needed to tie the closure to the tree behind. This device is used when the cavity entrance is very wide, or for such parts of the closure as occupy the wider portions of a cavity entrance which may be narrow in other portions.

In the example illustrated in the last view the blocks 10 are built up behind the inturned edges of the opening to the cavity 7 in the tree-trunk 4, which edges are cut away behind to form comparatively plane surfaces 27—27 for the front faces of the end portions of said blocks. As the blocks 10 are laid up in the cavity 7 they are secured and braced against the surfaces 27 by the blocks 11 which are introduced between said blocks 10 and the back side of said cavity. I prefer to arrange the brace blocks 11, so far as feasible, with their geometrical structure in agreement with that of the tree and the blocks 10, for the same reason that I follow this course with the exterior closure blocks. The entrance to the cavity 7 is completely closed by the blocks 10.

In all cases where possible I break joints in laying up the blocks.

The healing tissue of the tree grows onto the face of the closure built into such tree, from the exterior edges of the cavity-opening, it being understood that the front edges of such closure in no case project beyond the corresponding edges of the wood of the tree, and eventually such tissue and the bark may cover said closure face.

In preparing any cavity for its closure, the bark should be cut back a little way from the front edge of the opening in the wood as left after being cut away to remove all decayed matter and prepare it to receive the closure. This feature is clearly shown in the drawings.

It is to be understood that the tree cavities are thoroughly and entirely cleared of decayed matter and their walls treated with antiseptic substances before the closures are built in.

Inasmuch as no two cavities are alike and that conditions vary so much in different trees, it is evident that considerable latitude in matters of detail must be allowed, and I do not, therefore, restrict myself to the specific structures herein illustrated and described, but desire to cover broadly the means for giving effect to or carrying out the method, as well as the method itself.

What is meant by the terms "radial" and "tangential" applied to the surfaces of my wood blocks, and as employed herein and in the claims, may be explained as follows: Either radial surface of a block is one which coincides or is parallel with, approximately, a line extending from the pith or center of the tree from which such block is cut, to the bark or exterior of such tree, and either tangential surface of such block is one which is substantially at right-angles to the radial surface of said line.

What I claim as my invention, and desire to secure by Letters Patent, is—

1. In tree surgery, a cavity closure comprising a plurality of cut wood blocks arranged with their cross-section surfaces abutting and with their radial surfaces abutting.

2. In tree surgery, a cavity closure comprising a plurality of cut wood blocks arranged with their cross-section surfaces abutting, and their radial surfaces abutting, and means to fasten said blocks to a tree.

3. In tree surgery, a plurality of transversely grooved blocks, rods receivable in the grooves in said blocks, brackets extending into said grooves and having arms which are adapted to be attached to the sides of a tree cavity, between such sides and adjacent parts of said blocks, and means to fasten said rods to said brackets within said grooves.

4. In tree surgery, a plurality of transversely grooved blocks, rods receivable in the grooves in said blocks and having their ends extended beyond such plurality of blocks and adapted to enter slots in the sides of a tree cavity, brackets having arms which are adapted to be attached to the sides of said cavity, between such sides and adjacent parts of said blocks, and means to fasten said rods to said brackets within said grooves.

5. In tree surgery, a cavity closure comprising a plurality of blocks arranged with their cross-section surfaces and their radial surfaces respectively in abutting relation, said blocks having grooves in their cross-section surfaces, which grooves extend between said radial surfaces of such blocks and form channels, and rods in such channels to support said blocks and lock them together.

6. In tree surgery, a cavity closure comprising a plurality of blocks arranged with their cross-section surfaces and their radial surfaces respectively in abutting relation, said blocks having grooves in their cross-section surfaces, which grooves extend between said radial surfaces of such blocks and form channels, and said blocks also having grooves in said radial surfaces, which last-mentioned grooves extend between said cross-section surfaces and form channels, and rods in both sets of said channels.

7. In tree surgery, a cavity closure comprising a plurality of blocks arranged with their cross-section surfaces and their radial surfaces respectively in abutting relation, said blocks having grooves in their radial surfaces, which grooves extend between said cross-section surfaces of said blocks and form channels, and rods in such channels to support said blocks and lock them together.

8. In tree surgery, a cavity closure comprising a plurality of blocks, a supporting rod for said blocks, a bolt adapted to pass through the back of a tree, a nut on the outer terminal of said bolt, and a tie-rod between said first-mentioned rod and said bolt, said tie-rod having its forward terminal entered between two of said blocks as far as said supporting rod.

GEORGE E. STONE.

Witnesses:
F. A. CUTTER,
A. C. FAIRBANKS.